(12) United States Patent
Tanaka (10) Patent No.: US 10,818,098 B2
(45) Date of Patent: Oct. 27, 2020

(54) DRAWING METHOD FOR ASSIGNING DRAWING PATTERNS TO UNIT DRAWING AREA FORMING AT LEAST PART OF FIRST SURFACE OR AT LEAST PART OF SECOND SURFACE, DRAWING APPARATUS, AND RECORDING MEDIUM

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 17 days.

(21) Appl. No.: 15/873,326

(22) Filed: Jan. 17, 2018

(65) Prior Publication Data
US 2018/0204389 A1    Jul. 19, 2018

(30) Foreign Application Priority Data

Jan. 17, 2017    (JP) .................................. 2017-005990

(51) Int. Cl.
  *G06T 19/20*    (2011.01)
  *G06F 7/57*    (2006.01)
  (Continued)

(52) U.S. Cl.
  CPC ................ *G06T 19/20* (2013.01); *G06F 7/57* (2013.01); *G06F 17/17* (2013.01); *G06T 11/206* (2013.01);
  (Continued)

(58) Field of Classification Search
  CPC ....... G06T 19/20; G06T 11/206; G06T 15/10; G06T 2219/2012; G06F 7/57; G06F 17/17
  See application file for complete search history.

(56) References Cited

U.S. PATENT DOCUMENTS

| 5,649,078 A | * | 7/1997 | Gerth | .................... G06T 15/405 345/422 |
| 5,870,098 A | * | 2/1999 | Gardiner | ................. G06T 17/05 345/426 |

(Continued)

FOREIGN PATENT DOCUMENTS

| JP | H05-258075 A | 10/1993 |
| JP | H09-330422 A | 12/1997 |

(Continued)

OTHER PUBLICATIONS

Busking, Stef, et al. "Image-based rendering of intersecting surfaces for dynamic comparative visualization." The visual computer 27.5 (2011): 347-363. (Year: 2011).*

(Continued)

*Primary Examiner* — King Y Poon
*Assistant Examiner* — Vincent Peren
(74) *Attorney, Agent, or Firm* — Scully Scott Murphy & Presser (57) ABSTRACT

According one embodiment, there is provided a drawing method, that comprises: when at least part of a first surface and at least part of a second surface are practically congruent to each other in a three-dimensional coordinate system, assigning each of a first drawing pattern related to the first surface and a second drawing pattern related to the second surface to any one of more than one unit drawing area forming the at least part of the first surface or the at least part of the second surface, drawing the more than one unit drawing area by using the first drawing pattern and the second drawing pattern each assigned to any one of the more than one unit drawing area, and thereby drawing the at least part of the first surface or the second surface.

11 Claims, 9 Drawing Sheets

(51) Int. Cl.
  *G06T 15/10* (2011.01)
  *G06F 17/17* (2006.01)
  *G06T 11/20* (2006.01)

(52) U.S. Cl.
  CPC ...... *G06T 15/10* (2013.01); *G06T 2219/2012* (2013.01)

(56) References Cited

U.S. PATENT DOCUMENTS

2013/0127895 A1* 5/2013 Miller .................. G06T 15/40 345/589
2016/0140772 A1* 5/2016 Tabota .................. G06T 17/00 345/420

FOREIGN PATENT DOCUMENTS

| JP | 2000-149053 A | 5/2000 |
| JP | 2001-167289 A | 6/2001 |
| JP | 2011-192233 A | 9/2011 |

OTHER PUBLICATIONS

Gribble, Christiaan, Alexis Naveros, and Ethan Kerzner. "Multi-hit ray traversal." Journal of Computer Graphics Techniques (JCGT) 3.1 (2014). (Year: 2014).*

Vasilakis, Andreas-Alexandros, and Ioannis Fudos. "Depth-fighting aware methods for multifragment rendering." IEEE transactions on visualization and computer graphics 19.6 (2013): 967-977. (Year: 2013).*

* cited by examiner

[Math][Rad][Norm1]  [d/c][Real]

aX+bY+cZ+d=0

| a | b | c | d |
|---|---|---|---|
| 1 | 1 | 1 | 0 |

[EXPRESS][VECTOR][POINTS][EDIT]  [SET]

0

Gf(12)

X+Y+Z=0

(B)

[Math][Rad][Norm1]  [d/c][Real]

$\vec{r}=\vec{r_0}+s\vec{u}+t\vec{v}$

| | $\vec{r_0}$ | $\vec{u}$ | $\vec{v}$ |
|---|---|---|---|
| X | 0 | 1 | 0 |
| Y | 0 | 0 | 1 |
| Z | 0 | −1 | −1 |

−1

[EXPRESS][VECTOR][POINTS][EDIT]  [SET]

Gf(12)

$\begin{cases} X=S \\ Y=T \\ Z=-S-T \\ \text{※S and T are parameters} \end{cases}$ (C)

[Math][Rad][Norm1]  [d/c][Real]

Plane through 3 points

| | X | Y | Z |
|---|---|---|---|
| P1 | 0 | 1 | −1 |
| P2 | 1 | 0 | −1 |
| P3 | 1 | −1 | 0 |

0

[EXPRESS][VECTOR][POINTS][EDIT]  [SET]

Gf(12)

Plane passing through three points P1, P2 and P3
P1 (0, 1, 1)
P2 (1, 0, −1)
P3 (1, −1, 0)

| a | b | c | r |
|---|---|---|---|
| 1 | 1 | 1 | 1 |

$(x-1)^2+(y-1)^2+(z-1)^2=1^2$ (B)

$X^2+Y^2+Z^2+aX+bY+cZ+d=0$

| a | b | c | d |
|---|---|---|---|
| −2 | −2 | −2 | 2 |

DRAWING METHOD FOR ASSIGNING DRAWING PATTERNS TO UNIT DRAWING AREA FORMING AT LEAST PART OF FIRST SURFACE OR AT LEAST PART OF SECOND SURFACE, DRAWING APPARATUS, AND RECORDING MEDIUM

CROSS-REFERENCE TO RELATED APPLICATIONS

This application is based upon and claims the benefit of priority from prior Japanese Patent Application No. 2017-005990, filed Jan. 17, 2017, the entire contents of which are incorporated herein by reference.

BACKGROUND OF THE INVENTION

1. Field of the Invention

The technical field relates to a drawing method for drawing a figure, a drawing apparatus, and a control program thereof.

2. Description of the Related Art

In a conventional figure drawing apparatus, for example, as disclosed in Jpn. Pat. Appln. KOKAI Publication No. 2011-192233, it is thought that when graphs corresponding to a plurality of inequalities are drawn in a two-dimensional coordinate system, overlapping portions of areas of the inequalities are distinguishably color-displayed.

BRIEF SUMMARY OF THE INVENTION

According to one embodiment, there is provided a drawing method, that includes: when at least part of a first surface and at least part of a second surface are practically congruent to each other in a three-dimensional coordinate system, assigning each of a first drawing pattern related to the first surface and a second drawing pattern related to the second surface to any one of more than one unit drawing area forming the at least part of the first surface or the at least part of the second surface, drawing the more than one unit drawing area by using the first drawing pattern and the second drawing pattern each assigned to any one of the more than one unit drawing area, and thereby drawing the at least part of the first surface or the second surface.

According to another embodiment, there is provided a drawing apparatus including: a processor, and a memory storing instructions that, when executed by the processor, causes the processor to: when at least part of a first surface and at least part of a second surface are practically congruent to each other in a three-dimensional coordinate system, assign each of a first drawing pattern related to the first surface and a second drawing pattern related to the second surface to any one of more than one unit drawing area forming the at least part of the first surface or the at least part of the second surface, draw the more than one unit drawing area by using the first drawing pattern and the second drawing pattern each assigned to any one of the more than one unit drawing area, and thereby draw the at least part of the first surface or the second surface.

According to another embodiment, there is provided a non-transitory recording medium having a program recorded thereon that is executable to control a computer to: when at least part of a first surface and at least part of a second surface are practically congruent to each other in a three-dimensional coordinate system, assign each of a first drawing pattern related to the first surface and a second drawing pattern related to the second surface to any one of more than one unit drawing area forming the at least part of the first surface or the at least part of the second surface, draw the more than one unit drawing area by using the first drawing pattern and the second drawing pattern each assigned to any one of the more than one unit drawing area, and thereby draw the at least part of the first surface or the second surface.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

Embodiments of the present invention will be described hereinafter with reference to the accompanying drawings.

Figure 1:
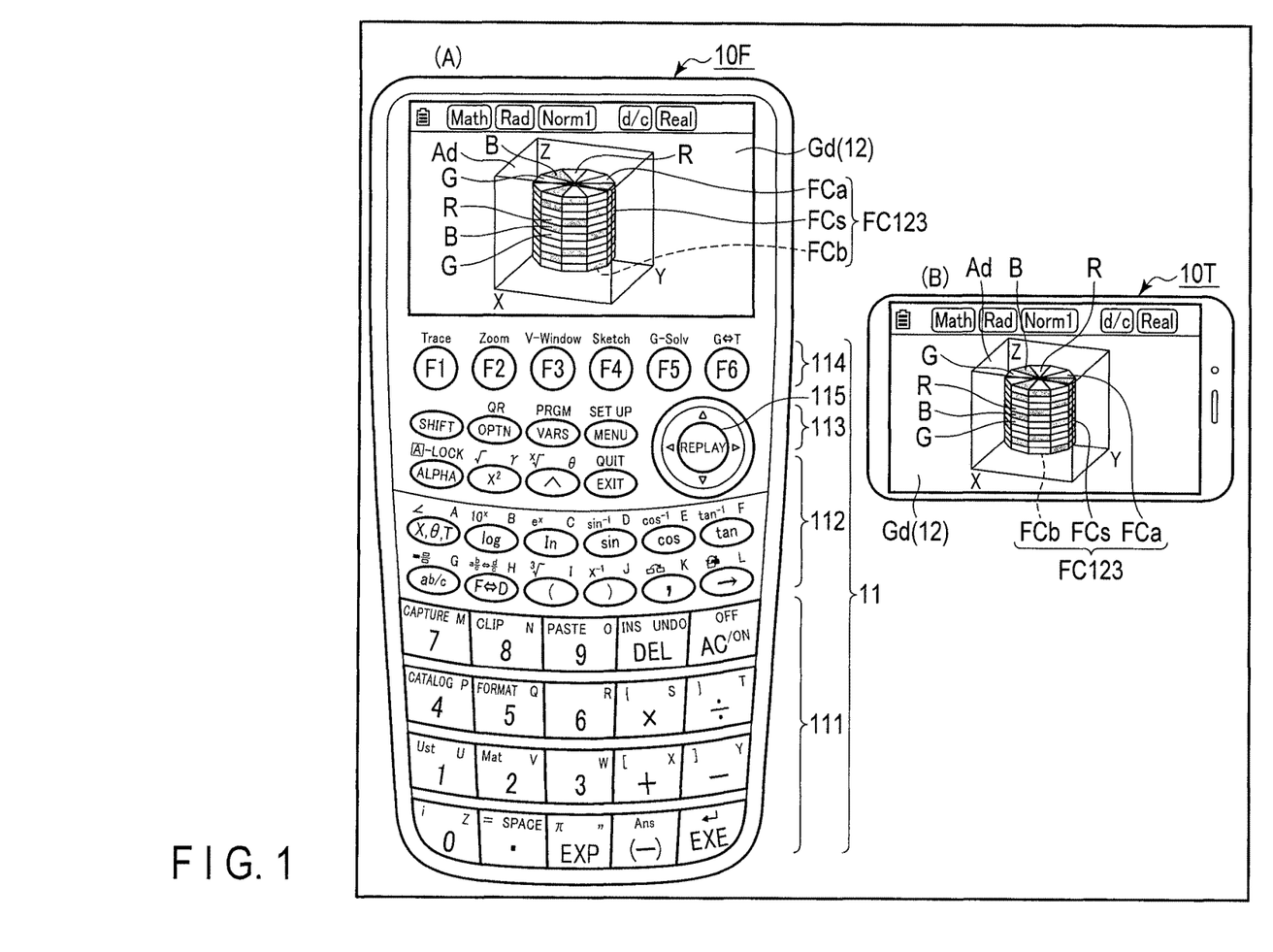
FIG. 1 is a front view illustrating an external configuration of a figure drawing apparatus 10 according to an embodiment of the present invention, part (A) of FIG. 1 being a view illustrating a case in which the figure drawing apparatus 10 is implemented as a graph scientific calculator 10F, and part (B) of FIG. 1 being a view illustrating a case in which the figure drawing apparatus 10 is implemented as a tablet terminal 10T.

FIG. 1 is a front view illustrating an external configuration of a figure drawing apparatus 10 according to an embodiment of the present invention. Part (A) of FIG. 1 is a view illustrating a case in which the figure drawing apparatus 10 is implemented as a graph scientific calculator 10F. Part (B) of FIG. 1 is a view illustrating a case in which the figure drawing apparatus 10 is implemented as a tablet terminal 10T.

The figure drawing apparatus 10 can be configured as the graph scientific calculator 10F or tablet terminal 10T. In addition, the figure drawing apparatus 10 can be configured as a personal computer, a smartphone, a mobile phone, a touch panel-type PDA (personal digital assistants), an electronic book, a portable game console, etc., in which 3D graph (figure) display control programs for drawing figures in a three-dimensional (3D) coordinate system are installed.

Besides, in the figure drawing apparatus 10 like the tablet terminal 10T which do not have such physical keys (buttons) as those provided in the graph scientific calculator 10F, a software keyboard simulating the keys of the graph scientific calculator 10F is displayed on a screen of a display output unit 12, and a process is executed in response to an input operation on the software keyboard.

Because of the need for portability, the graph scientific calculator 10F has such a small size that a user can surely hold the calculator 10F by one hand and can perform operations by one hand. A key input unit 11 and display output unit 12 are provided on the front surface of the main body of this graph scientific calculator 10.

The key input unit 11 is provided with a numeric/arithmetic sign key group 111 for inputting numerical values and mathematical expressions and instructing the execution of calculations; a functional-calculation function key group 112 for inputting various functions and activating a memory function; a mode setup key group 113 for displaying menu screens of various operation modes and instructing setup of operation modes; a function key group 114 for activating, by a single key operation, various functions displayed along a lower end of the display screen of the display output unit 12; and a cursor key 115 for performing a moving operation of a cursor displayed on the display output unit 12 and a selection operation of data items.

As the numeric/arithmetic sign key group 111, [0]-[9] (numeric) keys, [+], [−], [×] and [÷] (signs of four rules) keys, an [EXE] (execution) key, an [AC] (clear) key, etc. are arranged.

As the functional-calculation function key group 112, a [log] (logarithm) key, a [sin] (sine) key, a [cos] (cosine) key, a [tan] (tangent) key, etc. are arranged.

As the mode setup key group 113, a [MENU] key, a [SHIFT] key, an [OPTN] (option) key, etc. are arranged.

As the function key group 114, an [F1] key to an [F6] key are arranged.

Besides, when each key of the numeric/arithmetic sign key group 111, functional-calculation function key group 112, mode setup key group 113 and function key group 114 is operated successively after the operation of the [SHIFT] key, this key can function not as the key function described on the key top thereof, but as the function described above this key. For example, if the [AC] key is operated after the operation of the [SHIFT] key (hereinafter referred to as "[SHIFT]+[AC] key"), the [AC] key functions as an [OFF] (power off) key. The [SHIFT]+[MENU] key functions as a [SET UP] (setup) key. The [SHIFT]+[F3] key functions as a [V-Window] (View Window) key.

The display output unit 12 of the graph scientific calculator 10F is composed of a dot-matrix type liquid crystal display unit, and is not configured to be capable of accepting an input operation. The display output unit 12 of the tablet terminal 10T is composed such that a touch panel is provided on an outermost surface thereof, and is configured to be capable of accepting an input operation.

Each of parts (A) and (B) of FIG. 1 illustrates a state in which a 3D graph FC123 is drawn and displayed on the screen of the display output unit 12. In a case in which three mathematical expressions, the input of which was accepted, specify identical circular cylinders in a 3D coordinate system which is set up on the screen of the display output unit 12, the 3D graph FC123 is drawn and displayed in a 3D space (View Window) Ad that is the 3D coordinate system, in such a state that 3D graphs FC1, FC2 and FC3 corresponding to these three circular cylinders overlap each other. In each of an area FCa of a circle which becomes an upper cover, an area FCb of a circle which becomes a lower cover, and an area FCs of a side surface between the area FCa and area FCb, drawing patterns which are set up for the three 3D graphs FC1, FC2 and FC3 are assigned to respective unit drawing areas at random. The drawing patterns set up for the three 3D graphs FC1, FC2 and FC3 are such patterns that the fill colors are red R, blue B and green G, and the color of lines is black.

There is a case in which mathematical expressions and their parameters, which were input in order to draw the above-described plural 3D graphs, are identical. There is also a case in which mathematical expressions that were input are different in their representations, but these mathematical expressions are mathematically equal. Besides, there is a case in which positions of partial areas or the entire areas of the plural 3D graphs in the 3D coordinate system are practically congruent. In these cases, each of the plural drawing patterns associated with the plural 3D graphs is assigned to any one of a plurality of unit drawing areas (to be described later) corresponding to the practically congruent areas, and the plural unit drawing areas are drawn by using the drawing patterns assigned to the respective unit drawing areas. Thereby, it is easily understandable that the plural 3D graphs overlap in the practically congruent areas.

Here, the outline of a 3D graph drawing process in the figure drawing apparatus 10 will be described.

In this 3D graph drawing process, use is made of a drawing method in which a surface of a 3D graph (figure) is modeled as a set of polygons (grids).

Specifically, in accordance with a mathematical expression for drawing a 3D graph (figure) and the parameters of the mathematical expression, coordinate sequences constituting the surface of the figure that is the target of drawing are arithmetically processed and calculated. Areas (unit drawing areas) of polygons (grids), which are generated by finely dividing an area between the calculated coordinate sequences, are drawn as color-filled areas. Thereby, the 3D graph (figure) is displayed.

For example, in the case of the circular cylinder (circle-added figure) FC123 as illustrated in FIG. 1, a coordinate sequence constituting the circumference of one circle (upper cover) of the circular cylinder FC123 in the 3D space Ad, and a coordinate sequence constituting the circumference of the other circle (lower cover) FCb are arithmetically processed and calculated. In addition, a coordinate sequence constituting a line connecting the calculated coordinate sequence corresponding to the one circle FCa and the coordinate sequence corresponding to the other circle FCb is arithmetically processed and calculated as a coordinate sequence constituting a side surface FCs of the circular cylinder FC123.

In addition, the coordinate points of the calculated coordinate sequence corresponding to the one circle FCa, coordinate sequence corresponding to the other circle FCb and coordinate sequence corresponding to the side surface FCs of the circular cylinder are drawn in the order of the one circle FCa, the other circle FCb and the side surface Fs. Thereby, the circular cylinder (circle-added figure) FC123 is displayed.

At this time, as regards the one circle FCa and the other circle FCb, the surfaces thereof are constituted by the sets of many triangles (grids (polygons)) which are formed by being divided by radial lines connecting the coordinate point of the center of each circle and the respective coordinate points corresponding to the circumference of the circle, and by being divided by lines connecting the respective coordinate points on the circumference of the circle. In addition, the side surface is constituted by the set of many quadrangles (grids (polygons)) which are formed by being divided by lines connecting the respective coordinate points corresponding to the circumference of the one circle FCa, and the respective coordinate points corresponding to the circumference of the other circle FCb.

Actually, drawing is not performed with respect to all the calculated coordinate points which constitute the one circle FCa, the other circle FCb and the side surface FCs. A division number of triangles (grids (polygons)) which constitute the circle, and a division number of quadrangles (grids (polygons)) which constitute the side surface, are set. Then, as regards each of the one circle FCa and other circle FCb, the vertex coordinates of the respective triangles, which are generated by dividing the circle in the circumferential direction in accordance with the set division number, are determined, and the circle is drawn. In addition, as regards the side surface FCs, the vertex coordinates of quadrangles are determined and the side surface FCs is drawn. The quadrangles are generated by being divided vertically and horizontally by lines in a vertical direction (Z direction) which connect the coordinate points on the circumference of the triangles generated by dividing the one circle FCa, and the coordinate points on the circumference of the triangles generated by dividing the other circle FCb, and by lines in the horizontal direction (X-Y direction) which divides a region between the one circle FCa and other circle FCb in accordance with the set division number.

Figure 2:
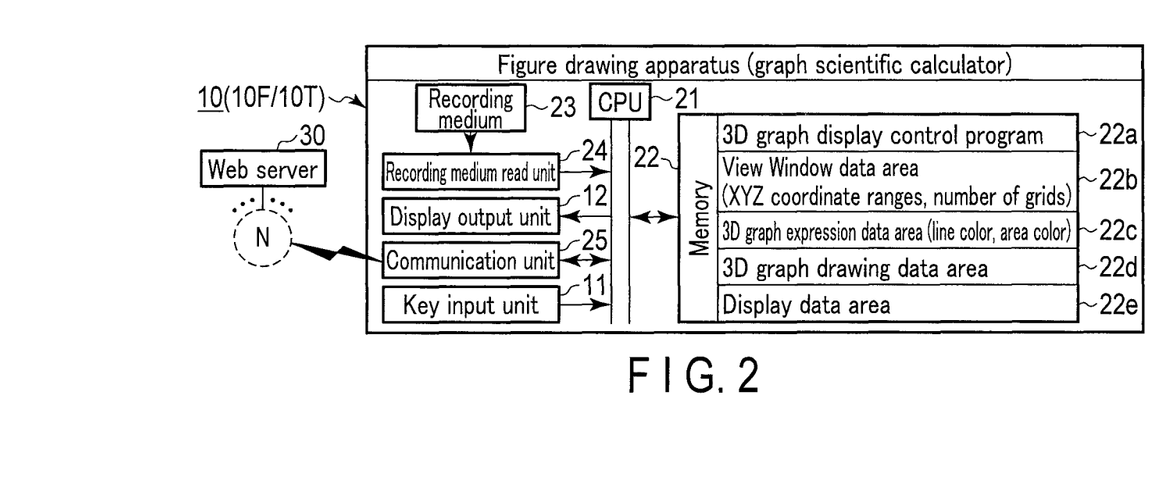
FIG. 2 is a block diagram illustrating the configuration of electronic circuitry of the figure drawing apparatus 10 (10F/10T).

FIG. 2 is a block diagram illustrating the configuration of electronic circuitry of the figure drawing apparatus 10 (10F/10T).

The electronic circuitry of this figure drawing apparatus 10 includes, in addition to the above-described key input unit 11 and display output unit 12, a CPU 21 that is a computer, a memory 22, a recording medium read unit 24, and a communication unit 25.

The CPU 21 controls the operations of the respective circuitry components according to a 3D graph (figure) display control program 22a stored in the memory 22, and executes various arithmetic processes corresponding to key input signals from the key input unit 11. This 3D graph display control program 22a may be prestored in the memory 22, or may be stored in the memory 22 by being read in from an external recording medium 23 such as a memory card through the recording medium read unit 24. The 3D graph display control program 22a is configured to be not rewritable by the user's operation of the key input unit 11.

In the memory 22, an area, which stores data that is rewritable by the user, is secured in addition to the area which stores the information that is not rewritable by the user as described above. This rewritable area stores data of mathematical expressions, table data, graph data, etc., which are constituted by key code data that are successively key-input by the key input unit 11.

In addition, in the area of the memory 14, which stores the rewritable data, a V-Window data area 22b, a 3D graph expression data area 22c, a 3D graph drawing data area 22d and a display data area 22e are secured.

The V-Window data area 22b stores data of a 3D space Ad (Xmin, max/Ymin, max/Zmin, max) for 3D graph (figure) drawing and data of a division number (grid) of grids (polygons), which are input in accordance with user operations (or preset) on a drawing area setup screen (not shown) displayed on the display output unit 12 by operating the [V-Window] (View Window) key.

Figure 5:
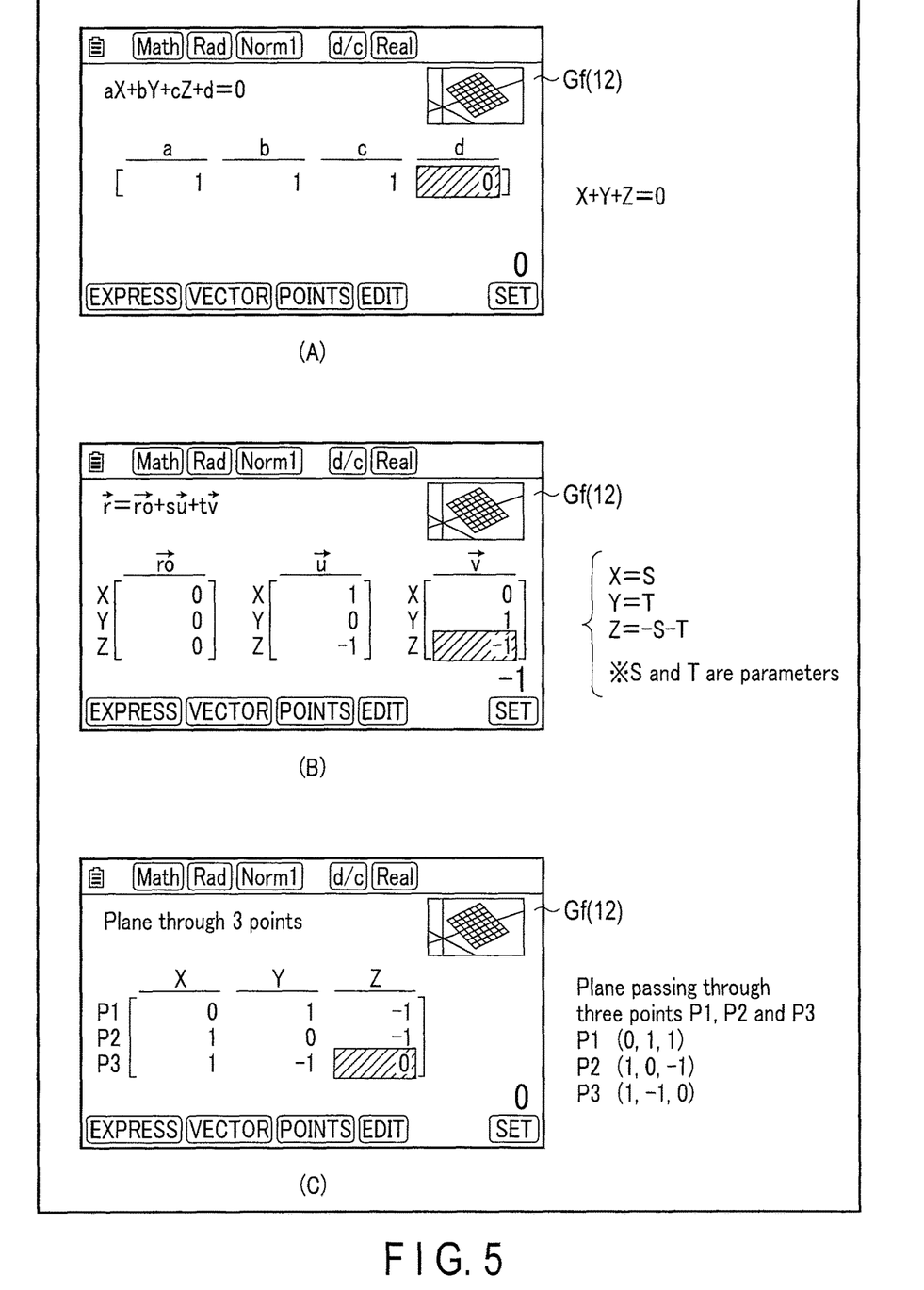
FIG. 5 is a view illustrating a 3D graph expression input screen Gf in a case of drawing three identical 3D graphs (plane figures FP1, FP2, FP3) on the basis of mathematical expressions of different modes according to the 3D graph drawing process of the figure drawing apparatus 10.

The 3D graph expression data area 22c stores data of a graph expression and parameters thereof which are input in accordance with user operations on a 3D graph expression input screen Gf (see FIG. 5: here, 3D graph expression input screen Gf for drawing a plane figure). The 3D graph expression input screen Gf is displayed on the display output unit 12 by selecting an icon [3D-Graph] for drawing a 3D graph (figure) from an operation menu (not shown) that is displayed in accordance with the operation of the above-described [MENU] (menu) key. Moreover, data of drawing colors (line color and area color) of a 3D graph (figure) corresponding to the graph expression, which are selected according to a line (Line)/area (Area) select screen Gs and a drawing color select screen Gc to be described later (see FIG. 6), is stored and set in the 3D graph expression data area 22c. In the meantime, the graph expression that is input according to the 3D graph expression input screen Gf may be a graph expression which is input by being designated from among a plurality of preset graph expressions by a user operation.

Besides, graph expressions for plane figure drawing on the 3D graph expression input screen Gf illustrated in parts (A), (B) and (C) of FIG. 5 are different in their mathematical representations, namely an equation with three unknowns, a vector equation, and a matrix. However, these graph expressions are mathematical expressions for drawing an identical plane figure, and these mathematical expressions are defined as mathematical expressions which are mathematically equal in the 3D graph drawing.

The 3D graph drawing data area 22d stores drawing data of the 3D graph (figure) (vertex coordinates of each of grids which constitute, by a set of grids (polygons), a surface of the figure) and data of drawing colors for the grids (a line color of a boundary defining neighboring grids, and an area color in the grid), based on the data of the graph expression of the 3D graph (figure) and parameters thereof which are stored in 3D graph expression data area 22c, and the data of the drawing colors (line color and area color (fill color or color pattern)) of the 3D graph (figure).

The display data area 22e includes a memory area corresponding to the display size of the liquid crystal display unit that constitutes the display output unit 12. This memory area stores display data, which is to be displayed on the liquid crystal display unit, as bitmap data (here, bitmap data developed in accordance with the data representing the 3D space Ad, the drawing data of the 3D graph (figure) and the data of the drawing colors (line color and area color)).

Figure 3:
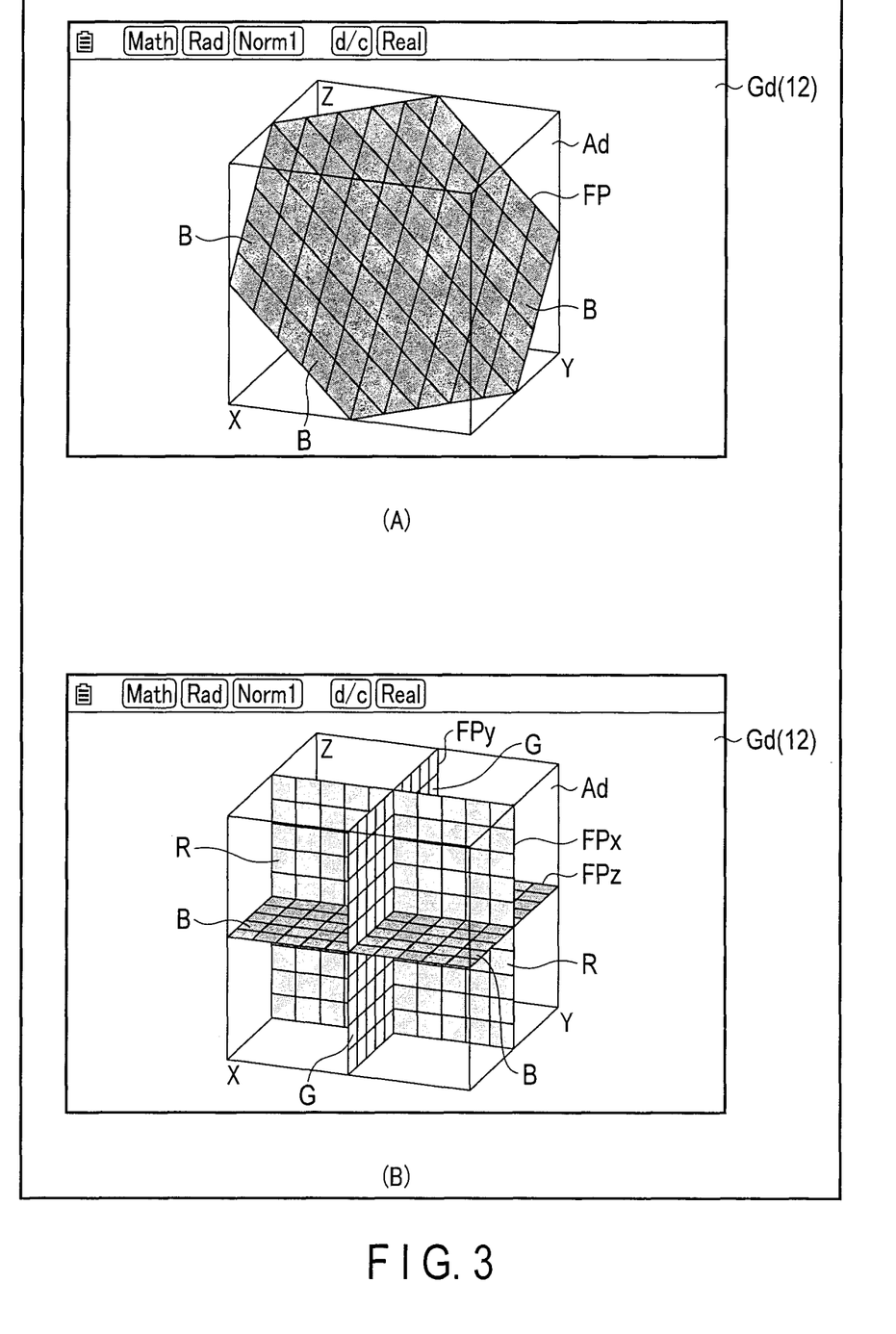
FIG. 3 is a view illustrating display states of 3D graphs (figures) drawn by a 3D graph (figure) drawing function of the figure drawing apparatus 10, part (A) of FIG. 3 being a view illustrating a display state of a 3D graph screen Gd in which one 3D graph (plane figure FP) is drawn, and part (B) of FIG. 3 being a view illustrating a display state of the 3D graph screen Gd in which three 3D graphs (plane figures FPx, FPy, FPz) are drawn.

FIG. 3 is a view illustrating display states of 3D graphs (figures) drawn by a 3D graph (figure) drawing function of the figure drawing apparatus 10. Part (A) of FIG. 3 is a view illustrating a display state of a 3D graph screen Gd in which one 3D graph (plane figure FP) is drawn. Part (B) of FIG. 3 is a view illustrating a display state of the 3D graph screen Gd in which three 3D graphs (plane figures FPx, FPy, FPz) are drawn.

In the case of one 3D graph (plane figure FP) illustrated in part (A) of FIG. 3, the graph expression thereof is:

$$aX+by+cZ+d=0(a=1,b=1,c=1,d=0).$$

The drawing pattern (here, the drawing color) of the area (unit drawing area) of each grid (polygon), which constitutes a plane of the plane figure FP, is set to blue B.

In the case of three 3D graphs (plane figures FPx, FPy and FPz) illustrated in part (B) of FIG. 3, the graph expressions thereof are:

$$FPx;X=0$$

$$FPy;Y=0$$

$$FPz;Z=0.$$

The drawing pattern (here, the drawing color) of the area (unit drawing area) of each grid (polygon), which constitutes a plane of the plane figure FPx, is set to red R. The drawing pattern of the area of each grid, which constitutes a plane of the plane figure FPy, is set to green G. The drawing pattern of the area of each grid, which constitutes a plane of the plane figure FPz, is set to blue B.

In this manner, the 3D graphs (plane figures FPx, FPy and FPz), which are displayed on the 3D graph screen Gd, are displayed such that the areas of the grids constituting the plane figures FPx, FPy and FPz are drawn by the drawing patterns (red R, green G and blue B) which are set for the plane figures FPx, FPy and FPz.

In the figure drawing apparatus 10 (10F/10T) with the above-described configuration, the CPU 21 controls the operations of the respective circuitry components according to the instructions described in the 3D graph display control program 22a, and the software and hardware cooperate to realize a 3D graph (figure) drawing function which will be described in the following operational description.

Next, the operation of the figure drawing apparatus 10 with the above-described configuration will be described.

Figure 4:
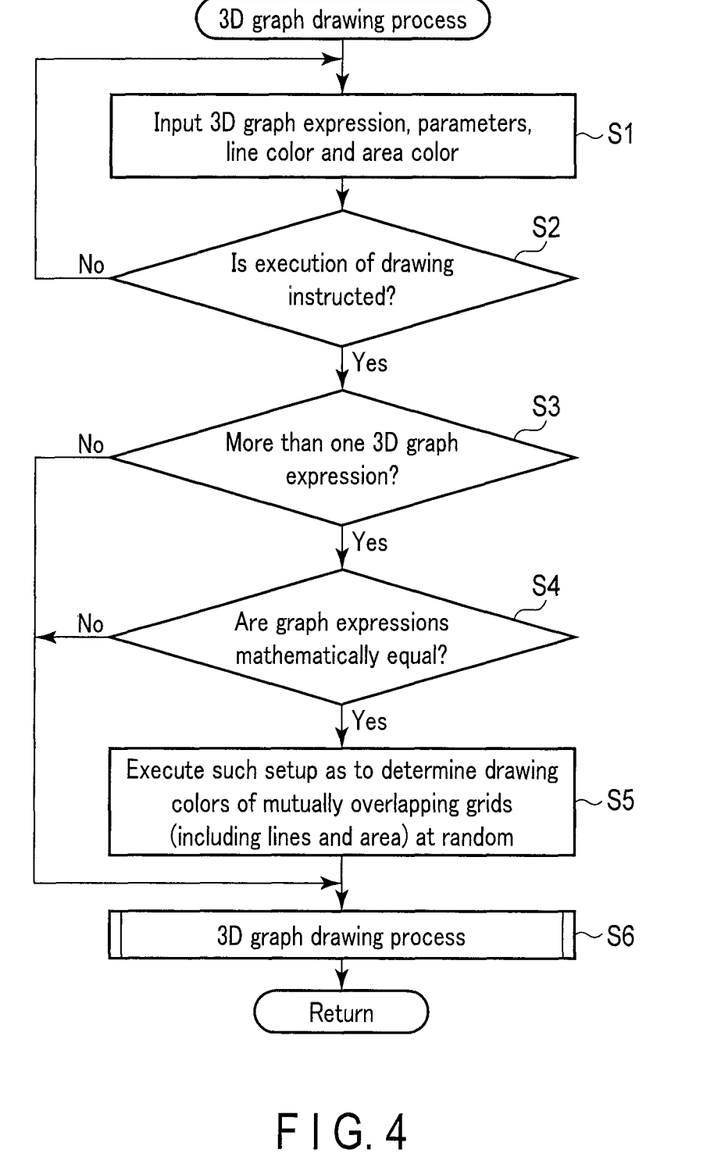
FIG. 4 is a flowchart illustrating a 3D graph drawing process of the figure drawing apparatus 10.

FIG. 4 is a flowchart illustrating a 3D graph drawing process of the figure drawing apparatus 10.

First Embodiment

FIG. 5 is a view illustrating a 3D graph expression input screen Gf in a case of drawing three identical 3D graphs (plane figures FP1, FP2, FP3) on the basis of mathematical expressions of different modes according to the 3D graph drawing process of the figure drawing apparatus 10.

Figure 6:
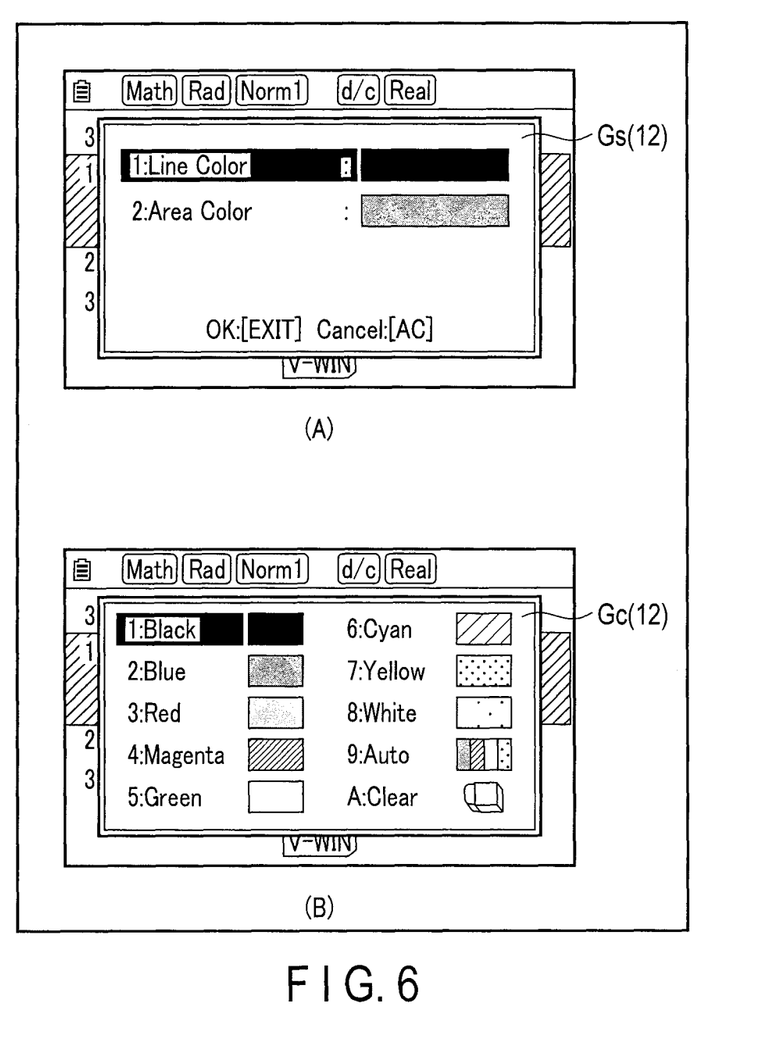
FIG. 6 is a view illustrating a line (Line)/area (Area) select screen Gs and a drawing color select screen Gc for setting up a drawing color (drawing pattern) for a 3D graph (figure) that is a target of drawing according to the 3D graph drawing process of the figure drawing apparatus 10.

FIG. 6 is a view illustrating a line (Line)/area (Area) select screen Gs and a drawing color select screen Gc for setting up a drawing color (drawing pattern) for a 3D graph (figure) that is a target of drawing according to the 3D graph drawing process of the figure drawing apparatus 10. The drawing colors of the line color and area color, which can be selected by the drawing color select screen Gc, include a transparent color (Clear).

Figure 7:
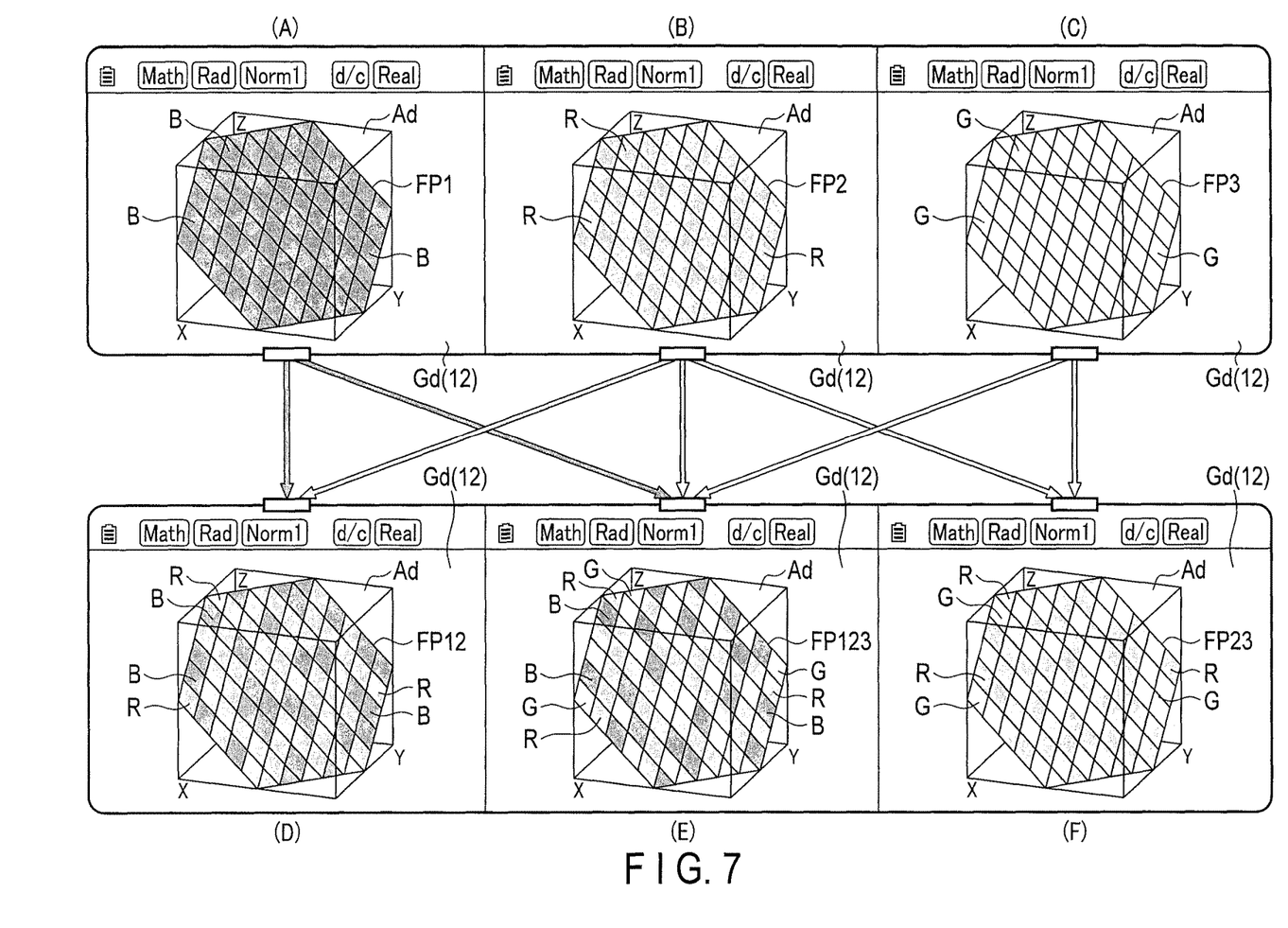
FIG. 7 is a view illustrating a 3D graph screen Gd in a case of discretionally combining and simultaneously drawing three identical 3D graphs (plane figures FP1, FP2, FP3) for which different drawing colors are set up according to the 3D graph drawing process of the figure drawing apparatus 10.

FIG. 7 is a view illustrating a 3D graph screen Gd in a case of discretionally combining and simultaneously drawing three identical 3D graphs (plane figures FP1, FP2, FP3) for which different drawing colors are set up according to the 3D graph drawing process of the figure drawing apparatus 10.

For example, the graph expressions (and parameters thereof) for drawing the three identical 3D graphs (plane figures FP1, FP2 and FP3) are input as follows. The graph expression of the plane figure FP1 is input by an equation with three unknowns, as illustrated in part (A) of FIG. 5. The graph expression of the plane figure FP2 is input by a vector equation with three unknowns, as illustrated in part (B) of FIG. 5. The graph expression of the plane figure FP3 is input by a matrix with three unknowns, as illustrated in part (C) of FIG. 5.

In addition, in accordance with the line (Line)/area (Area) select screen Gs and drawing color select screen Gc as illustrated in parts (A) and (B) of FIG. 6, the drawing colors (line color and area color) of the plane figure FP1 are set to blue B, the drawing colors (line color and area color) of the plane figure FP2 are set to red R, and the drawing colors (line color and area color) of the plane figure FP3 are set to green G.

The input data of the graphs and parameters thereof of the respective 3D graphs (plane figures FP1, FP2 and FP3) and the set-up data of the drawing colors for the respective 3D graphs (plane figures FP1, FP2 and FP3) are stored in the 3D graph expression data area 22c (step S1).

Then, if the execution of 3D graph (figure) drawing is instructed by the operation of the [EXE] key (step S2 (Yes)), it is judged whether there are a plurality of 3D graphs (figures) which require simultaneous drawing, based on whether there are a plurality of data of graph expressions stored in the 3D graph expression data area 22c (step S3).

If the graph expressions of the three identical 3D graphs (plane figures FP1, FP2 and FP3) exist in the 3D graph expression data area 22c and if it is thus judged that there are plural 3D graphs (figures) which require simultaneous drawing (step S3 (Yes)), it is judged whether the three graph expressions are mathematically equal or not (step S4).

That a plurality of graph expressions are mathematically equal means that when the respective graph expressions are modified or converted in the course of the graph (figure) drawing process thereof, the respective graph expressions become identical expressions, or that even if the respective graph expressions do not become identical, when 3D graphs (figures) corresponding to the respective graph expressions are drawn, the positions of the areas of the respective 3D graphs (figures) in the 3D coordinate system become congruent and are drawn in an overlapping manner. Here, depending on the precision of arithmetic calculation of the computer mounted in the graph scientific calculator 10F or tablet terminal 10T, there is a case in which, even when the graph expressions are not identical, the vertex coordinates of a plurality of polygons for drawing the 3D graphs corresponding to the respective graph expressions become congruent to each other.

If it is judged that the graph expressions of the three 3D graphs (plane figures FP1, FP2 and FP3) stored in the 3D graph expression data area 22c are mathematically equal (step S4 (Yes)), the drawing colors (line color and area color) of the areas of the grids of the surface where the respective 3D graphs (figures) overlap are set to be determined at random from among the drawing colors (here, blue B, red R and green G) stored in association with the respective graph expressions (figures) in the subsequently executed drawing process of the 3D graphs (figures) corresponding to the respective graph expressions (figures) (step S5).

Then, the 3D graphs (plane figures FP1, FP2 and FP3) corresponding to the three graph expressions, which were read out from the 3D graph expression data area 22c, are drawn according to the above-described 3D graph drawing process. As illustrated in part (E) of FIG. 7, the 3D graphs are displayed on the display output unit 12 as a 3D graph screen Gd of a plane figure FP123 in which the three plane figures FP1 to FP3 overlap. At this time, in accordance with the setup process of the drawing colors of grids in step S5, the fill colors of the areas of the grids of the surface where the plane figures FP1, FP2 and FP3 overlap each other are determined at random from among the blue B, red R and green G, and the 3D graphs are drawn (step S6).

Specifically, the case is now assumed in which the three 3D graph expressions, which were input as illustrated in parts (A) to (C) of FIG. 5, are mathematically equal expressions which are drawn as the identical 3D graphs (plane figures FP1, FP2 and FP3), and the drawing color of blue B is set for the graph expression of the plane figure FP1, the drawing color of red R is set for the graph expression of the plane figure FP2, and the drawing color of green G is set for the graph expression of the plane figure FP3. In this case, if the individual plane figures FP1, FP2 and FP3 are independently drawn, the plane figure FP1 of blue B, the plane figure FP2 of red R and the plane figure FP3 of green G are displayed as illustrated in parts (A), (B) and (C) of FIG. 7.

Here, when the graph expression of the plane figure FP1 and the graph expression of the plane figure FP2 were input and the figure drawing was executed, a plane figure FP12, in which the drawing colors (blue B and red R) set up for these graph expressions are assigned at random to the respective grids, is drawn and displayed as illustrated in part (D) of FIG. 7. In addition, when the graph expression of the plane figure FP2 and the graph expression of the plane figure FP3 were input and the figure drawing was executed, a plane figure FP23, in which the drawing colors (red R and green G) set up for these graph expressions are assigned at random to the respective grids, is drawn and displayed as illustrated in part (F) of FIG. 7.

Besides, as described above, when the graph expressions of the three plane figures FP1 to FP3 were input and the figure drawing was executed, a plane figure FP123, in which the drawing colors (blue B, red R and green G) set up for these graph expressions are assigned at random to the respective grids, is drawn and displayed as illustrated in part (E) of FIG. 7.

Thereby, when mathematical expressions and their parameters, which were input in order to draw the above-described plural 3D graphs, are identical, or when mathematical expressions that were input are different in their representations but these mathematical expressions are mathematically equal, or when positions of partial areas or the entire areas of the plural 3D graphs in the 3D coordinate system are practically congruent to each other, each of the plural drawing patterns associated with the plural 3D graphs is assigned to any one of a plurality of unit drawing areas (to be described later) corresponding to the practically congruent areas, and the plural unit drawing areas are drawn by using the drawing patterns assigned to the respective unit drawing areas. Thereby, it is easily understandable that the plural 3D graphs overlap in the practically congruent areas.

Second Embodiment

Figure 8:
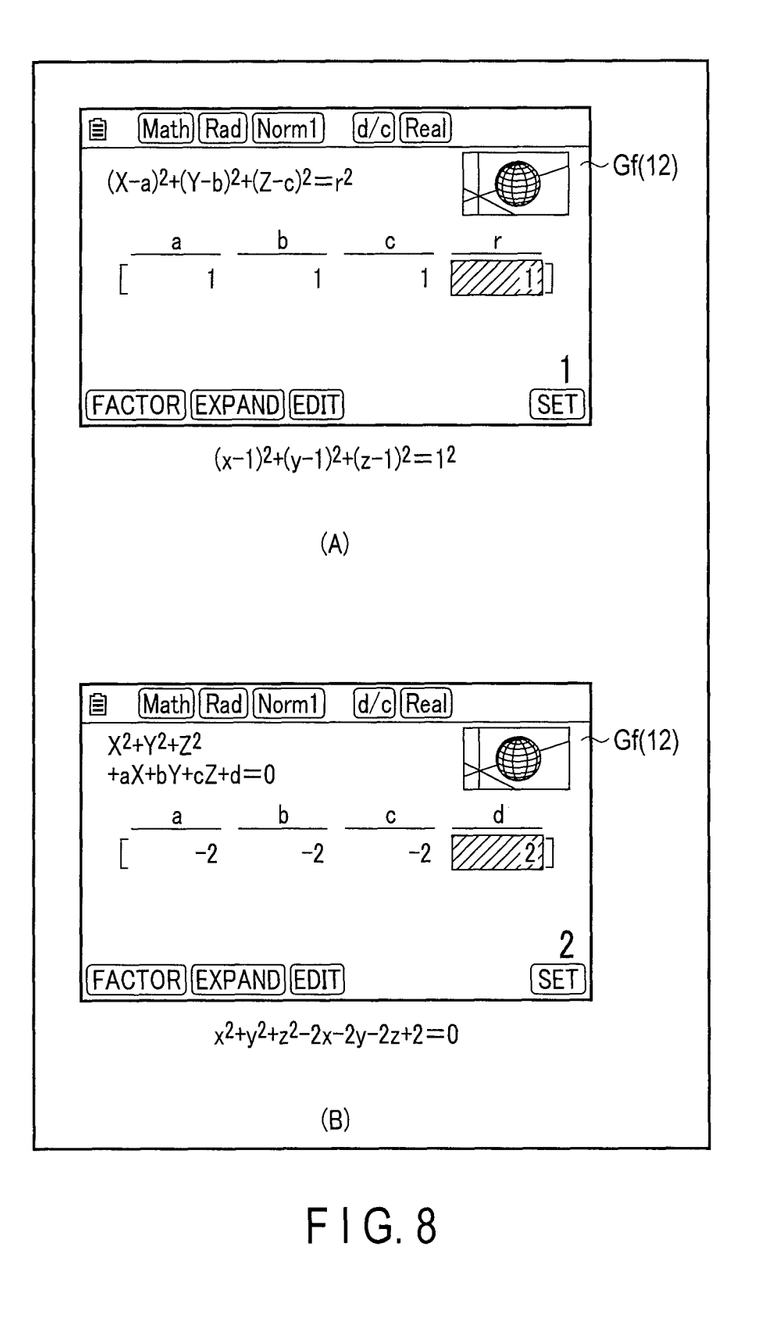
FIG. 8 is a view illustrating a 3D graph expression input screen Gf in a case of drawing three identical 3D graphs (spherical figures FB1, FB2, FB3) on the basis of mathematical expressions of different modes according to the 3D graph drawing process of the figure drawing apparatus 10.

FIG. 8 is a view illustrating a 3D graph expression input screen Gf in a case of drawing three identical 3D graphs (spherical figures FB1, FB2, FB3) on the basis of mathematical expressions of different modes according to the 3D graph drawing process of the figure drawing apparatus 10.

Figure 9:
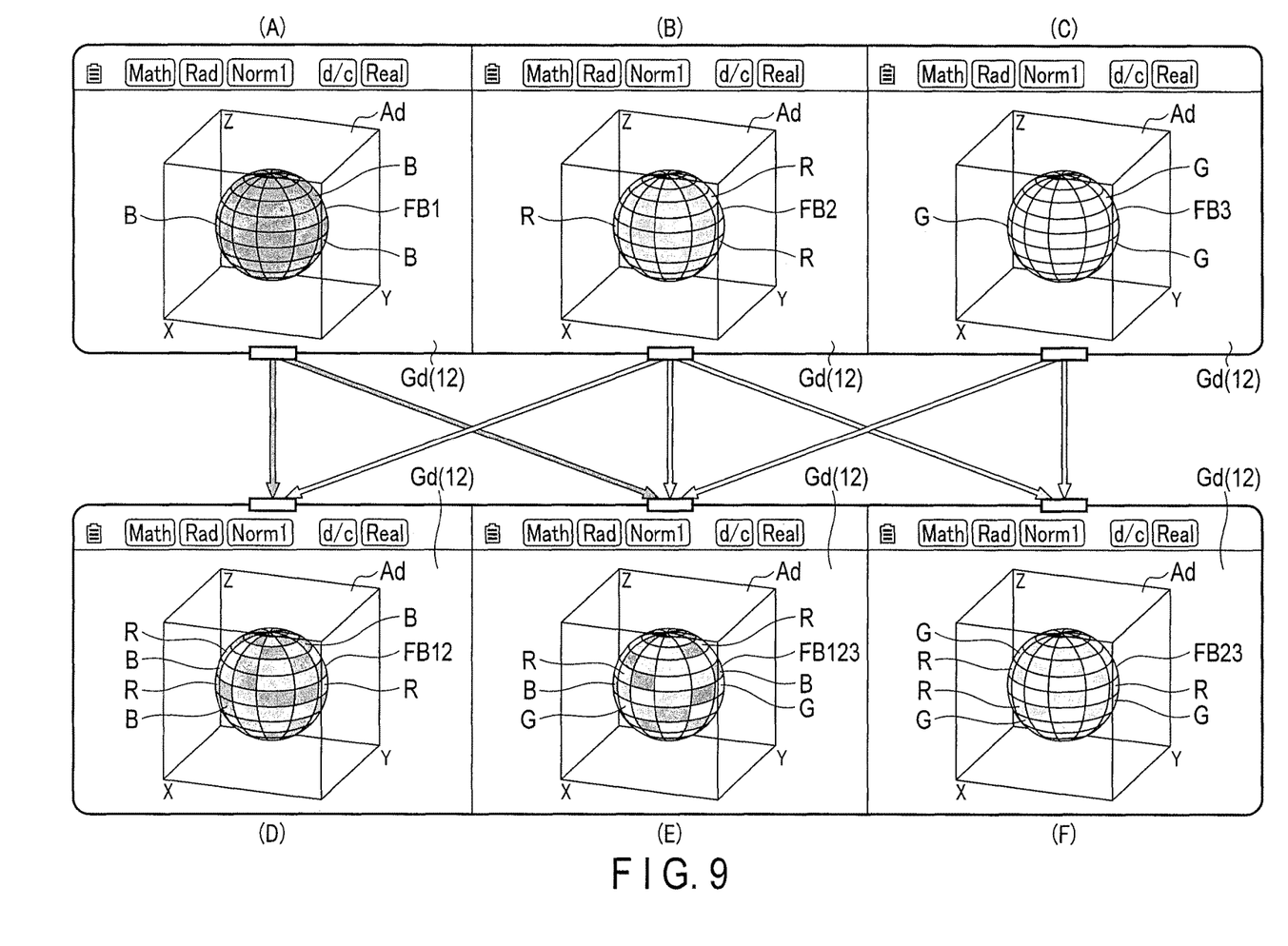
FIG. 9 is a view illustrating a 3D graph screen Gd in a case of discretionally combining and simultaneously drawing three identical 3D graphs (spherical figures FB1, FB2, FB3) for which different drawing colors are set up according to the 3D graph drawing process of the figure drawing apparatus 10.

FIG. 9 is a view illustrating a 3D graph screen Gd in a case of discretionally combining and simultaneously drawing three identical 3D graphs (spherical figures FB1, FB2, FB3) for which different drawing colors are set up according to the 3D graph drawing process of the figure drawing apparatus 10.

Specifically, the case is now assumed in which the 3D graph expressions, which were input as illustrated in parts (A) and (B) of FIG. 8, are mathematically equal expressions which are drawn as the identical three 3D graphs (spherical figures FB1, FB2 and FB3), and the drawing color of blue B is set for the graph expression of the spherical lane figure FB1, the drawing color of red R is set for the graph expression of the spherical figure FB2, and the drawing color of green G is set for the graph expression of the spherical figure FB3. In this case, if the individual spherical figures FB1, FB2 and FB3 are independently drawn, the spherical figure FB1 of blue B, the spherical figure FB2 of red R and the spherical figure FB3 of green G are displayed as illustrated in parts (A), (B) and (C) of FIG. 8.

Here, when the graph expression of the spherical figure FB1 and the graph expression of the spherical figure FB2 were input and the figure drawing was executed, a spherical figure FB12, in which the drawing colors (blue B and red R) set up for these graph expressions are assigned at random to the respective grids, is drawn and displayed as illustrated in part (D) of FIG. 8. In addition, when the graph expression of the spherical figure FB2 and the graph expression of the spherical figure FB3 were input and the figure drawing was executed, a spherical figure FB23, in which the drawing colors (red R and green G) set up for these graph expressions are assigned at random to the respective grids, is drawn and displayed as illustrated in part (F) of FIG. 8.

Besides, when the graph expressions of the three spherical figures FB1 to FB3 were input and the figure drawing was executed, a spherical figure FB123, in which the drawing colors (blue B, red R and green G) set up for these graph expressions are assigned at random to the respective grids, is drawn and displayed as illustrated in part (E) of FIG. 8.

Thereby, when mathematical expressions and their parameters, which were input in order to draw the above-described plural 3D graphs, are identical, or when mathematical expressions that were input are different in their representations but these mathematical expressions are mathematically equal, or when positions of partial areas or the entire areas of the plural 3D graphs in the 3D coordinate system are practically congruent, each of the plural drawing patterns associated with the plural 3D graphs is assigned to any one of a plurality of unit drawing areas (to be described later) corresponding to the practically congruent areas, and the plural unit drawing areas are drawn by using the drawing patterns assigned to the respective unit drawing areas. Thereby, it is easily understandable that the plural 3D graphs overlap in the practically congruent areas.

In the meantime, each of the above-described embodiments is configured such that the drawing patterns of the unit drawing areas (grids) constituting the surfaces of the plural 3D graphs (figures) are determined at random from among the drawing patterns that are set up in association with the respective graph expressions. However, the drawing patterns may be determined so as to vary regularly.

In addition, of the drawing patterns of the unit drawing areas (grids) constituting the surface of the 3D graph (figure), the drawing pattern (color) of the line (Line), which is the boundary between a mutually overlapping unit drawing area and a neighboring area, may be determined at random or in a regularly varying manner from among the drawing patterns (colors) that are set up in association with the respective graph expressions, or may be determined as a compound color of the respective drawing patterns (colors), or as a staggering pattern with the drawing patterns (colors) being varied between display dots.

Besides, in the above-described embodiments, as the kinds of 3D graphs (figures) that are targets of drawing, the plane figure, spherical figure and circular cylindrical figure were described. However, the drawing process may be similarly executed for other kinds of 3D graphs (figures). Thereby, when a plurality of surfaces are drawn in the 3D coordinate system which is set up on the screen of the display output unit 12 of the figure drawing apparatus 10, the 3D graphs (figures) can be displayed such that it is easily understandable that at least partial areas of the plural surfaces overlap.

In the meantime, the methods of the respective processes by the figure drawing apparatus 10, which has been described in each of the above embodiments, that is, the methods included in the 3D graph drawing process illustrated in the flowchart of FIG. 4 can be stored as computer-executable programs in a medium of an external storage device, such as a memory card (ROM card, RAM card, etc.), a magnetic disk (floppy (trademark) disk, hard disk, etc.), an optical disc (CD-ROM, DVD, etc.), or a semiconductor memory, and can be distributed. In addition, the computer (CPU) of the electronic device including the display function reads the program, which is stored in the medium of the external storage device, into the storage device, and the operation is controlled by this read-in program. Thereby, it is possible to realize the 3D graph (figure) drawing function described in each of the embodiments, and to execute the same processes as by the above-described methods.

In addition, the data of the program for realizing each of the above-described methods can be transmitted on a communication network (N) in the form of a program code, and the data of the program can be taken in the electronic device including the display function from a computer apparatus (program server) connected to this communication network (N), and stored in the storage device, thereby realizing the above-described 3D graph (figure) drawing function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drawing method comprising:
accepting, through an input device, an input of a first mathematical expression specifying a first surface in a three-dimensional coordinate system, and an input of a second mathematical expression specifying a second surface in the three-dimensional coordinate system;
determining whether at least part of the first surface and at least part of the second surface are practically congruent to each other, wherein the at least part of the first surface and the at least part of the second surface are determined to be practically congruent in response to determining one of:
in a case where a representation of the second mathematical expression is different from a representation of the first mathematical expression, the second mathematical expression is mathematically equal to the first mathematical expression;
the representation of the second mathematical expression is identical to the representation of the first mathematical expression; and
vertex coordinates of a unit drawing area forming the first surface and vertex coordinates of a unit drawing area forming the second surface coincide with each other; and
in response to determining that the at least part of the first surface and the at least part of the second surface are practically congruent to each other:
assigning one of a first drawing pattern related to the first surface and a second drawing pattern related to the second surface to each of one or more unit drawing areas forming the at least part of the first surface or the at least part of the second surface determined to be practically congruent to each other; and
controlling a screen to draw the one or more unit drawing areas.

2. The drawing method of claim 1,
wherein the first drawing pattern is designated by a first fill color, a first color pattern, or both, and the second drawing pattern is designated by a second fill color a second color pattern, or both, and
wherein the first drawing pattern and the second drawing pattern are assigned to each of the one or more unit drawing areas forming the at least part of the first surface or the at least part of the second surface determined to be practically congruent to each other such that the first drawing pattern and the second drawing pattern are assigned at random or regularly in the at least part of the first surface and the at least part of the second surface determined to be practically congruent to each other.

3. The drawing method of claim 1,
wherein the first drawing pattern is designated by a first line color of a line defining a corresponding unit drawing area of the one or more unit drawing areas forming the at least part of the first surface and the second drawing pattern is designated by a second line color of a line defining a corresponding unit drawing area of the one or more unit drawing areas forming the at least part of the second surface, and
wherein the first drawing pattern and the second drawing pattern are assigned to each of the one or more unit drawing areas forming the at least part of the first surface or the at least part of the second surface determined to be practically congruent to each other such that when a unit drawing area of the first surface and a unit drawing area of the second surface share a shared line:
one of the first line color or the second line color is designated to the shared line;
a compound color of the first line color and the second line color is designated to the shared line; or
a staggering pattern, in which display dots of the first line color and the second line color are alternately arranged, is designated to the shared line.

4. The drawing method of claim 1, further comprising:
accepting setup of the first drawing pattern related to the first surface, and setup of the second drawing pattern related to the second surface.

5. The drawing method of claim 1, further comprising:
controlling the screen to draw each of the one or more unit drawing areas as a polygon.

6. A drawing apparatus comprising:
a processor, and a memory storing instructions that, when executed by the processor, causes the processor to:
accept, through an input device, an input of a first mathematical expression specifying a first surface in a three-dimensional coordinate system, and an input of a second mathematical expression specifying a second surface in the three-dimensional coordinate system;
determine whether at least part of the first surface and at least part of the second surface are practically congruent to each other, wherein the at least part of the first surface and the at least part of the second surface are determined to be practically congruent in response to determining one of:
in a case where a representation of the second mathematical expression is different from a representation of the first mathematical expression, the second mathematical expression is mathematically equal to the first mathematical expression;
the representation of the second mathematical expression is identical to the representation of the first mathematical expression; and
vertex coordinates of a unit drawing area forming the first surface and vertex coordinates of a unit drawing area forming the second surface coincide with each other; and
in response to determining that the at least part of the first surface and the at least part of the second surface are practically congruent to each other:
assign one of a first drawing pattern related to the first surface and a second drawing pattern related to the second surface to each of one or more unit drawing areas forming the at least part of the first surface or the at least part of the second surface determined to be practically congruent to each other; and
control a screen to draw the one or more than one unit drawing areas by using the one of the first drawing pattern and the second drawing pattern assigned to the one or more unit drawing areas.

7. The drawing apparatus of claim 6,
wherein the first drawing pattern is designated by a first fill color, a first color pattern, or both, and the second drawing pattern is designated by a second fill color, a second color pattern, or both, and
wherein the instructions, when executed by the processor, cause the processor to assign the first drawing pattern and the second drawing pattern to each of the one or more unit drawing areas forming the at least part of the first surface or the at least part of the second surface determined to be practically congruent to each other such that the first drawing pattern and the second drawing pattern are assigned at random or regularly in the at least part of the first surface and the at least part of the second surface determined to be practically congruent to each other.

8. The drawing apparatus of claim 6,
wherein the first drawing pattern is designated by a first line color of a line defining a corresponding unit drawing area of the one or more unit drawing areas forming the at least part of the first surface and the second drawing pattern is designated by a second line color of a line defining a corresponding unit drawing area of the one or more unit drawing areas forming the at least part of the second surface, and
wherein the instructions, when executed by the processor, cause the processor to assign the first drawing pattern and the second drawing pattern to each of the one or more unit drawing areas forming the at least part of the first surface or the at least part of the second surface determined to be practically congruent to each other such that when a unit drawing area of the first surface and a unit drawing area of the second surface share a shared line:
one of the first line color or the second line color is designated to the shared line;
a compound color of the first line color and the second line color is designated to the shared line; or
a staggering pattern, in which display dots of the first line color and the second line color are alternately arranged, is designated to the shared line.

9. A non-transitory recording medium having a program recorded thereon that is executable to control a computer to:
accept, through an input device, an input of a first mathematical expression specifying a first surface in a three-dimensional coordinate system, and an input of a second mathematical expression specifying a second surface in the three-dimensional coordinate system;
determine whether at least part of the first surface and at least part of the second surface are practically congruent to each other, wherein the at least part of the first surface and the at least part of the second surface are determined to be practically congruent in response to determining one of:
in a case where a representation of the second mathematical expression is different from a representation of the first mathematical expression, the second mathematical expression is mathematically equal to the first mathematical expression;
the representation of the second mathematical expression is identical to the representation of the first mathematical expression; and
vertex coordinates of a unit drawing area forming the first surface and vertex coordinates of a unit drawing area forming the second surface coincide with each other; and
in response to determining that the at least part of the first surface and the at least part of the second surface are practically congruent to each other:
assign one of a first drawing pattern related to the first surface and a second drawing pattern related to the second surface to each of one or more unit drawing areas forming the at least part of the first surface or the at least part of the second surface determined to be practically congruent to each other; and control a screen to draw the one or more unit drawing areas by using the one of the first drawing pattern and the second drawing pattern assigned to the one or more unit drawing areas.

10. The non-transitory recording medium of claim 9,
wherein the first drawing pattern is designated by a first fill color, a first color pattern, or both, and the second drawing pattern is designated by a second fill color a second color pattern, or both, and
wherein the program is executable to control the computer to assign the first drawing pattern and the second drawing pattern to each of the one or more unit drawing areas forming the at least part of the first surface or the at least part of the second surface determined to be practically congruent to each other such that the first drawing pattern and the second drawing pattern are assigned at random or regularly in the at least part of the first surface and the at least part of the second surface determined to be practically congruent to each other.

11. The non-transitory recording medium of claim 9,
wherein the first drawing pattern is designated by a first line color of a line defining a corresponding unit drawing area of the one or more unit drawing areas forming the at least part of the first surface and the second drawing pattern is designated by a second line color of a line defining a corresponding unit drawing area of the one or more unit drawing areas forming the at least part of the second surface, and
wherein the program is executable to control the computer to assign the first drawing pattern and the second drawing pattern to each of the one or more unit drawing areas forming the at least part of the first surface or the at least part of the second surface determined to be practically congruent to each other such that when a unit drawing area of the first surface and a unit drawing area of the second surface share a shared line:
one of the first line color or the second line color is designated to the shared line;
a compound color of the first line color and the second line color is designated to the shared line; or
a staggering pattern, in which display dots of the first line color and the second line color are alternately arranged, is designated to the shared line.

* * * * *

UNITED STATES PATENT AND TRADEMARK OFFICE
CERTIFICATE OF CORRECTION

PATENT NO. : 10,818,098 B2
APPLICATION NO. : 15/873326
DATED : October 27, 2020
INVENTOR(S) : Hirokazu Tanaka It is certified that error appears in the above-identified patent and that said Letters Patent is hereby corrected as shown below:

In the Claims

Column 12, Claim 2, Line 42 should read:
drawing pattern is designated by a second fill color, a Column 13, Claim 6, Line 55 should read:
control a screen to draw the one or more Column 15, Claim 10, Line 8 should read:
drawing pattern is designated by a second fill color, a Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*